United States Patent
Miura et al.

(10) Patent No.: US 7,516,810 B2
(45) Date of Patent: Apr. 14, 2009

(54) INDUSTRIAL VEHICLE

(75) Inventors: Michihiro Miura, Kariya (JP);
Kazutoshi Yamada, Kariya (JP);
Tadashi Yamada, Kariya (JP)

(73) Assignee: Kabushiki Kaisha Toyota Jidoshokki, Kariya-Shi (JP)

( * ) Notice: Subject to any disclaimer, the term of this patent is extended or adjusted under 35 U.S.C. 154(b) by 250 days.

(21) Appl. No.: 11/418,592

(22) Filed: May 4, 2006

(65) Prior Publication Data
US 2006/0254847 A1 Nov. 16, 2006

(30) Foreign Application Priority Data
May 13, 2005 (JP) .............................. P2005-141728

(51) Int. Cl.
*B60K 28/04* (2006.01)
(52) U.S. Cl. ...................................... 180/273; 307/10.1
(58) Field of Classification Search ................. 180/272, 180/273, 271; 307/9.1, 10.1, 10.6
See application file for complete search history.

(56) References Cited

U.S. PATENT DOCUMENTS

| 3,838,748 | A | 10/1974 | Gray et al. |
| 4,019,602 | A | 4/1977 | Habiger |
| 4,466,504 | A | 8/1984 | Giandenoto et al. |
| 5,109,945 | A | 5/1992 | Koga |
| 7,240,757 | B2 * | 7/2007 | Ueda et al. ............. 180/273 |
| 2004/0089491 | A1 | 5/2004 | Reuter |
| 2004/0256168 | A1 * | 12/2004 | Ueda et al. ............. 180/273 |

FOREIGN PATENT DOCUMENTS

| EP | 1 481 944 A2 | 12/2004 |
| JP | 2-51934 | 4/1990 |

OTHER PUBLICATIONS

European Search Report Aug. 16, 2006.

* cited by examiner

*Primary Examiner*—Ruth Ilan
*Assistant Examiner*—Drew J. Brown
(74) *Attorney, Agent, or Firm*—Locke Lord Bissell & Liddell, LLP

(57) ABSTRACT

In an industrial vehicle, a controller controls an energizing state of an electromagnetic control valve. The controller is electrically connected to a driver detection switch and a position detection switch. The controller breaks energization of the electromagnetic control valve if the driver detection switch detects that a driver of the vehicle is not seated. The controller energizes or reenergizes the electromagnetic control valve if the driver detection switch detects that the driver is seated and the position detection switch detects that the manipulation position of the direction indication member is a neutral position and then a forward or backward position.

8 Claims, 3 Drawing Sheets

INDUSTRIAL VEHICLE

BACKGROUND OF THE INVENTION

The present invention relates to an industrial vehicle such as a forklift truck.

The forklift truck is widely used as the industrial vehicle to perform loading operation (operation for picking up or putting down load) in a factory yard. In such a forklift truck, an operator or driver of the forklift truck is engaged in not only driving the vehicle but also loading. The driver therefore frequently leaves the seat of the vehicle in an idling state, which may cause a dangerous state. To avoid it, Japanese Unexamined Utility Model Publication No. 2-51934 proposes a safety device for use in restoring a running state of the vehicle after the driver leaves the seat.

In the above reference, the seat is provided with a seat switch for detecting whether the driver is seated. If the seat switch detects that the driver is not seated, energization of a solenoid valve is broken. The solenoid valve changes flow of hydraulic fluid into a transmission (clutch mechanism) connected to an engine. If the driver who has left the seat returns to the vehicle, when the driver is seated and a manipulation position of a lever for forward or backward movement is a neutral position, the solenoid valve is reenergized.

Meanwhile, there is a way that a detection switch directly detects whether the manipulation position of the lever is a position of the forward movement or a position of the backward movement and judges that the neutral position is detected if the manipulation position is neither the position of the forward movement nor the position of the backward movement. In the forklift truck using such a detection way of the manipulation position, if the solenoid valve is reenergized under the condition of the return of the safety device as described in the above reference, the forklift truck has the following problems.

That is, in the case of the above detection way, if the connection between the detection switch and a controller is broken, the controller erroneously judges that the manipulation position of the lever is the neutral position. Therefore, if the driver leaves the seat with the lever manipulated in the position of the forward or backward movement and the connection between the detection switch and the controller is then broken in this state, when the driver is seated, it is erroneously judged or detected that the manipulation position of the lever is the neutral position, thereby to restore the running state. Consequently, the running state is restored only by the judgment of the seat switch that the driver is seated. Therefore, when the safety device of the above reference is applied to the forklift truck which uses the above detection way, the safety device is subject to an influence (such as disconnection) of various detection switches for detecting condition that restores the running state, so that reliability of the safety device deteriorates. If the running state of the vehicle, especially with the torque converter is restored under the above condition, the vehicle may run away due to a creep phenomenon of the toque converter by reenergizing the solenoid valve.

The present invention is directed to an industrial vehicle which prevents erroneous return of the running state due to erroneous detection of various detection switches by adding driving manipulation of the driver to the condition of the return of the running state when the running state is restored after the driver leaves the seat, thereby to improve reliability of the return of the running state.

SUMMARY OF THE INVENTION

An industrial vehicle according to the present invention provides the following features. The industrial vehicle has drive wheels driven by an engine. The industrial vehicle includes a power transmission device, a driver detection switch, a direction indication member, a position detection switch, an electromagnetic control valve and a controller. The engine is connected to the drive wheels through the power transmission device for transmitting output of the engine to the drive wheels thereby to run the vehicle. The driver detection switch detects whether a driver of the vehicle is seated in a driver's cabin in a driving position. The direction indication member is manipulated by the driver for indicating forward or backward movement of the vehicle. The position detection switch detects a manipulation position of the direction indication member. The electromagnetic control valve changes flow of hydraulic fluid supplied into the power transmission device. The controller controls an energizing state of the electromagnetic control valve. The controller is electrically connected to the driver detection switch and the position detection switch. The controller breaks energization of the electromagnetic control valve if the driver detection switch detects that the driver is not seated. The controller energizes or reenergizes the electromagnetic control valve if the driver detection switch detects that the driver is seated and the position detection switch detects that the manipulation position of the direction indication member is a neutral position and then a forward or backward position.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

The following will describe a preferred embodiment of the invention. In the present embodiment, the invention is embodied to a counterbalanced forklift truck with reference to FIGS. 1, 2, 3A, 3B and 4. In the following description, "forward" and "backward" directions are based on the state where a driver of the forklift truck faces forward (in a direction of forward movement) of the forklift truck.

Figure 1:
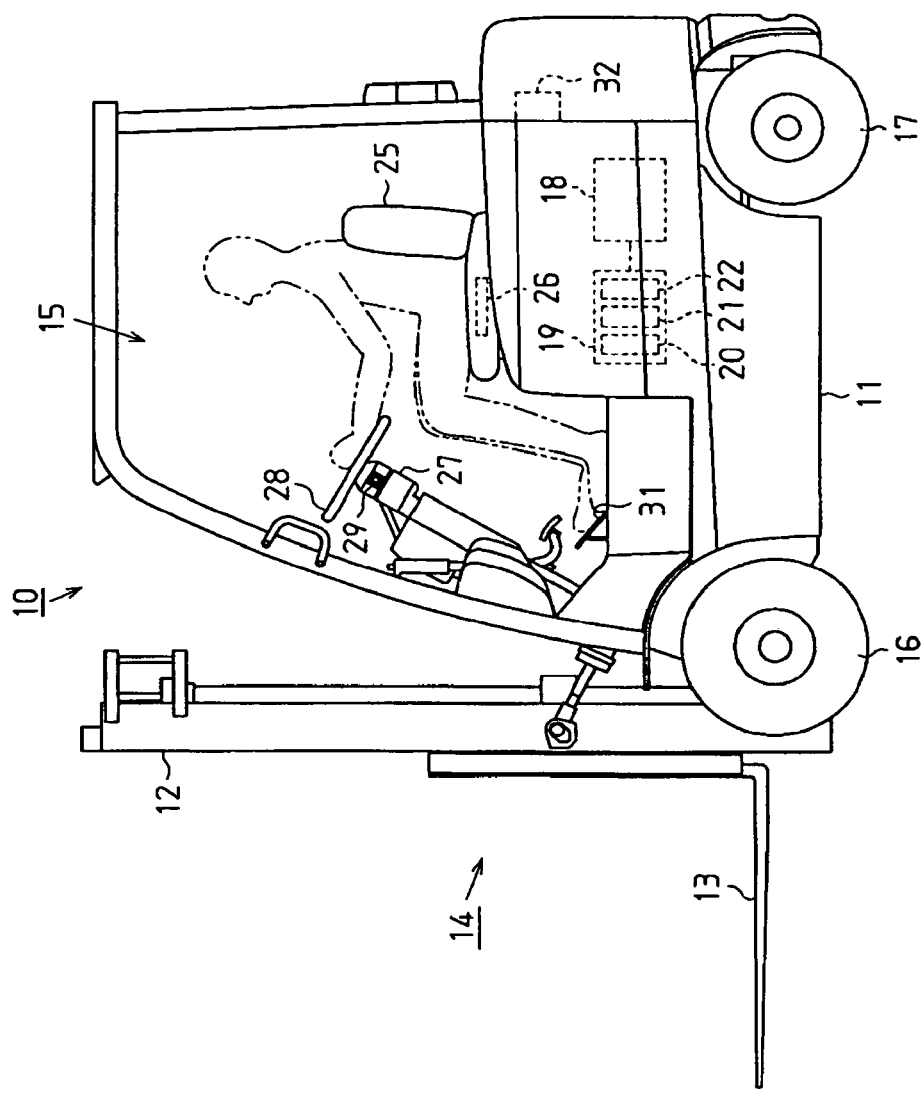
FIG. 1 is a side view showing a forklift truck according to a preferred embodiment of the present invention.

As shown in FIG. 1, a forklift truck 10 that serves as an industrial vehicle includes a body 11 of the vehicle and a loading apparatus 14 provided forward of the body 11. The loading apparatus 14 has a mast 12 and a fork 13. A driver's cab 15 is provided in the middle of the body 11. Drive wheels (front wheels) 16 are provided in the lower part of the body 11 forward of the body 11 and steered wheels 17 are provided in the lower part of the body 11 backward of the body 11. An engine 18 is mounted on the body 11 and is connected to the drive wheels 16 through a transmission 19 that serves as a power transmission device. The forklift truck 10 of the present embodiment is an engine type forklift truck where the drive wheels 16 are driven by the engine 18 to run the forklift truck.

The transmission 19 includes a torque converter 20, a clutch mechanism 21 for forward movement and a clutch mechanism 22 for backward movement to form an automatic transmission. Each of the clutch mechanisms 21 and 22 is a hydraulic type clutch mechanism. Hydraulic fluid is supplied to the clutch mechanisms 21 and 22 through a solenoid valve for forward movement 23 (shown in FIGS. 2 and 4) and a solenoid valve for backward movement 24 (shown in FIGS. 2 and 4) each of which serve as an electromagnetic valve. That is, the flow of the hydraulic fluid into the transmission 19 is changed under the control of the solenoid valves 23 and 24. When the solenoid valve 23 is energized, the hydraulic fluid is supplied to the clutch mechanism 21 to run the forklift truck 10 forward. When the solenoid valve 24 is energized, the hydraulic fluid is supplied to the clutch mechanism 22 to run the forklift truck 10 backward.

The driver's cab 15 has a seat 25 on which the driver is seated. In the forklift truck 10 of the present embodiment, when the driver is seated in the seat 25, it is regarded that the driver is seated in the driver's cab 15 in a driving position. When the driver is seated in the driver's cab 15, the driver is in a seating state. When the driver is not seated in the driver's cab 15, the driver is in a non-seating state. The seat 25 is provided with a switch 26 for detecting whether the driver is seated, which serves as a driver detection switch. The switch 26 detects whether the driver is seated in the driver's cab 15 in a driving position and outputs the detection result as a detection signal. The detection signal of the switch 26 is hereinafter referred to as "seating signal".

In the driver's cab 15, a steering column 27 is provided forward of the seat 25. A steering wheel 28 is mounted on the steering column 27 to change a steering angle of the steered wheels 17.

A lever (shift lever) 29 for forward or backward movement is provided on the steering column 27 and serves as a direction indication member for indicating a running direction of the vehicle. In the present embodiment, the lever 29 is capable of selectively indicating "forward movement" or "backward movement" as a running direction of the vehicle. In the present embodiment, when the lever 29 is manipulated so as to be inclined from a neutral position forward, the lever 29 selectively indicates "forward movement". When the lever 29 is manipulated so as to be inclined from the neutral position backward, the lever 29 selectively indicates "backward movement". The manipulation position in which the lever 29 selectively indicates "forward movement" is a forward position and the manipulation position in which the lever 29 selectively indicates "backward movement" is a backward position.

The steering column 27 is provided with a switch (direction switch) 30 for detecting forward or reverse movement (shown in FIGS. 2 and 4), which detects the manipulation position (the forward or backward position) of the lever 29. The switch 30 serves as a position detection switch. The switch 30 outputs the respective detection signals in accordance with the manipulation positions of the lever 29. It is noted that the switch 30 does not output the detection signal when the lever 29 is in the neutral position (or the detection of the neutral position is not performed). When the switch 30 detects the forward position as the manipulation position of the lever 29, the detection signal is hereinafter referred to as "forward signal". When the switch 30 detects the backward position as the manipulation position of the lever 29, the detection signal is hereinafter referred to as "backward signal".

An accelerator pedal (vehicle acceleration member) 31 is provided on the lower part of the driver's cab 15. The accelerator pedal 31 indicates acceleration (running) of the forklift truck 10 and adjusts its running speed.

Figure 2:
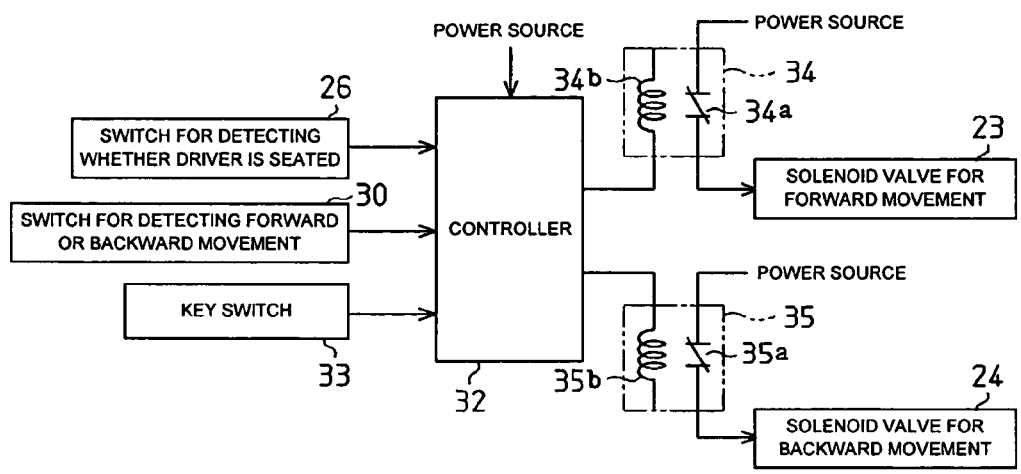
FIG. 2 is a block diagram showing a controlling structure of the forklift truck.
Figure 4:
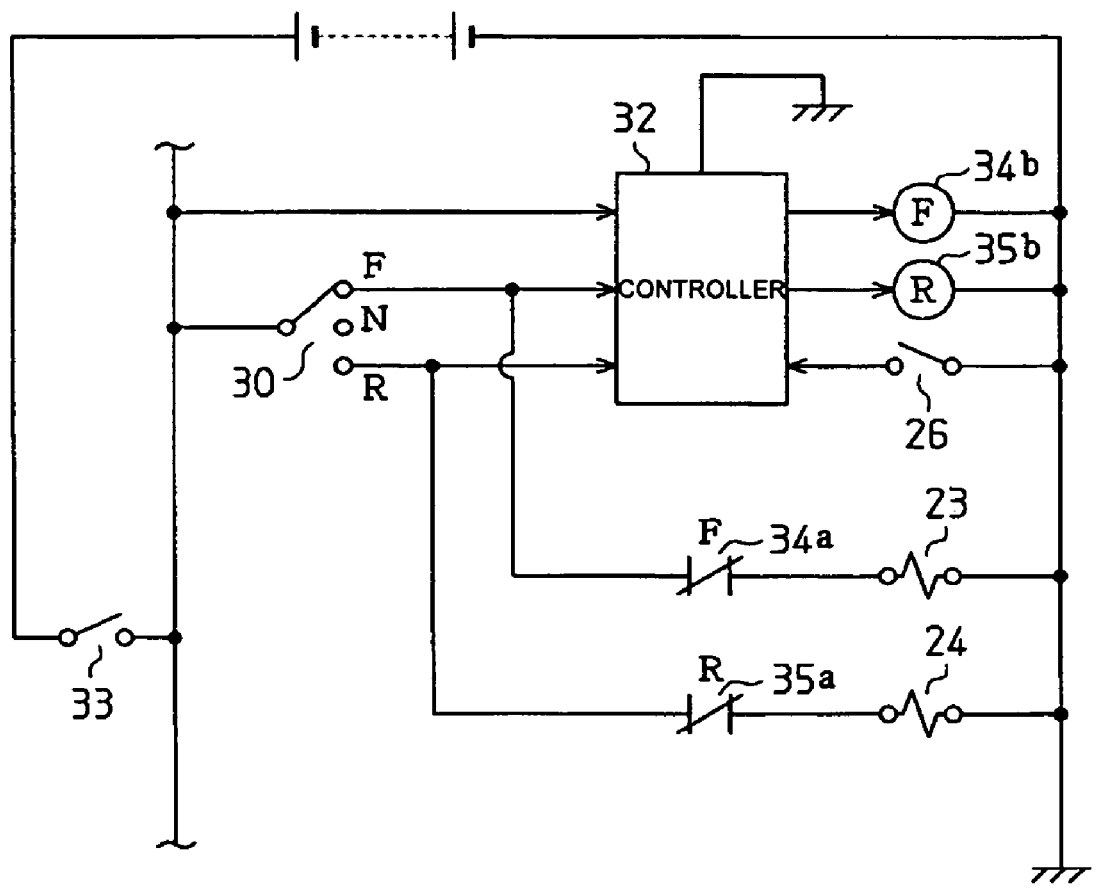
FIG. 4 is a circuit diagram showing a connecting state of a relay of the forklift truck.

The body 11 is provided with a controller 32 which performs various control of the forklift truck 10, such as running control. As shown in FIGS. 2 and 4, the switch 26, the switch 30 and a key switch 33 are electrically connected to the controller 32. The key switch 33 detects manipulation position of a starting switch key which starts or stops the engine 18, to output the detection result as a detection signal. The detection signal of the key switch 33 is hereinafter referred to as "key signal". The solenoid valve 23 is electrically connected to the controller 32 through a relay 34 for forward movement and the solenoid valve 24 is electrically connected to the controller 32 through a relay 35 for backward movement.

The relay 34 has a normally closed contact ("b" contact) 34a for forward movement and a relay coil (electromagnet) 34b for forward movement. When the relay coil 34b is deenergized to close the normally closed contact 34a, the solenoid valve 23 is energized. The relay 35 has a normally closed contact ("b" contact) 35a for backward movement and a relay coil (electromagnet) 35b for backward movement. When the relay coil 35b is deenergized to close the normally closed contact 35a, the solenoid valve 24 is energized.

Figure 3A:
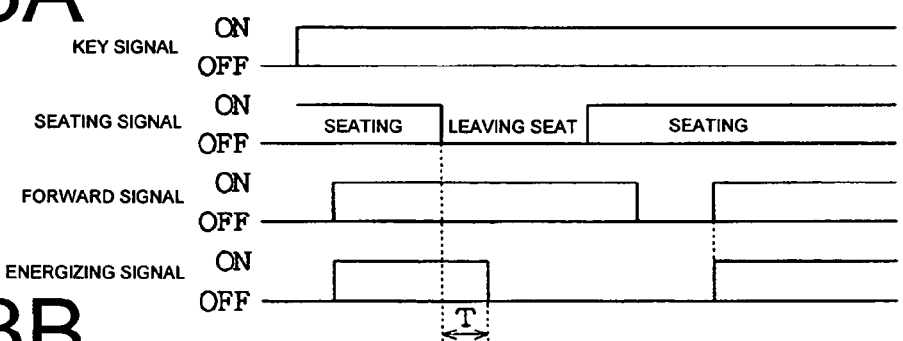
FIG. 3A is a timing chart showing an input-output signal of a controller of the forklift truck.
Figure 3B:
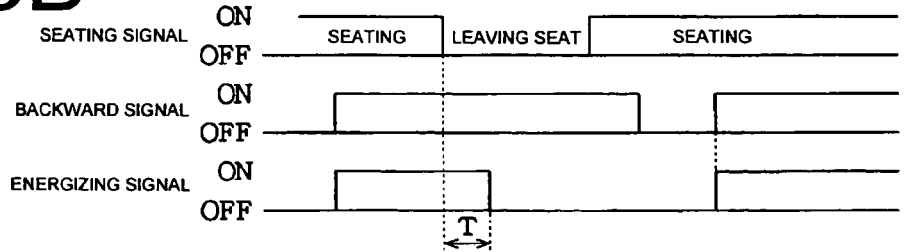
FIG. 3B is a timing chart showing an input-output signal of the controller of the forklift truck.

The following will describe running control executed by the controller 32 and in particular control of an energizing state (energization or break of energization) of the solenoid valves 23 and 24 with reference to FIGS. 3A, 3B and 4 in detail. The controller 32 executes the following control in accordance with a previously stored control program. Both of FIGS. 3A and 3B are timing charts showing input-output signals of the controller 32, respectively, and FIG. 4 is a circuit diagram showing a connecting state of the relay.

When the driver is seated on the seat 25 of the driver's cab 15 in the driving position and manipulates the starting switch key to start the engine 18, the key signal of the key switch 33 and the seating signal of the switch 26 are turned ON to input those signals into the controller 32. When the engine 18 is started, electric power is supplied to the controller 32, the relays 34 and 35. Therefore, when the relay coils 34b and 35b are energized to open the normally closed contacts 34a and 35a, the solenoid valves 23 and 24 are not energized.

When the driver manipulates the lever 29 from the neutral position to the forward position after starting the engine 18, the forward signal of the switch 30 is turned ON to input the signal into the controller 32. At this time, the controller 32 turns an energizing signal ON to energize the solenoid valve 23 thereby to input the signal into the relay 34 as shown in FIG. 3A. Consequently, when the relay coil 34b is deenergized to close the normally closed contact 34a, the solenoid valve 23 is energized. When the driver pushes the accelerator pedal 31, the forklift truck 10 moves forward at the speed in accordance with the pushing degree.

On the other hand, when the driver manipulates the lever 29 from the neutral position to the backward position after starting the engine 18, the backward signal of the switch 30 is turned ON to input the signal into the controller 32. At this time, the controller 32 turns the energizing signal ON to energize the solenoid valve 23 thereby to input the signal into the relay 35 as shown in FIG. 3B. Consequently, when the relay coil 35b is deenergized to close the normally closed contact 35a, the solenoid valve 24 is energized. When the driver pushes the accelerator pedal 31, the forklift truck 10 moves backward at the speed in accordance with the pushing degree.

Then, when the driver stops the forklift truck 10 and leaves the seat 25 to turn the seating signal of the switch 26 OFF, the controller 32 turns the energizing signal OFF in a predetermined delay time T of about 2 seconds. Therefore, in the case where the solenoid valve 23 is energized, when the relay coil 34b is energized to open the normally closed contact 34a, energization of the solenoid valve 23 is broken as shown in FIG. 3A. On the other hand, in the case where the solenoid valve 24 is energized, when the relay coil 35b is energized to open the normally closed contact 35a, energization of the solenoid valve 24 is broken as shown in FIG. 3B. That is, in the forklift truck 10 of the present embodiment, when the driver leaves the seat 25, energization of the solenoid valves 23 and 24 is broken regardless of the manipulation position ("forward position", "backward position" or "neutral position") of the lever 29.

Then, when the driver is reseated on the seat 25, the seating signal of the switch 26 is turned ON thereby to input the signal into the controller 32. When the seating signal is turned ON, if the forward or backward signal of the switch 30 is turned ON, the controller 32 does not turn the energizing signal ON. That is, when the seating signal is turned ON, the controller 32 judges whether the manipulation position of the lever 29 is the neutral position. When each of the forward and backward signals of the switch 30 is turned OFF, the controller 32 judges that the manipulation position of the lever 29 is the neutral position.

At this time, the controller 32 detects that the manipulation position of the lever 29 is the neutral position. Then, when any of the forward and backward signals of the switch 30 is turned ON, the controller 32 turns the energizing signal ON to reenergize the solenoid valve 23 or 24. When the forward signal is turned ON, the controller 32 turns the energizing signal of the relay 34 ON to energize the solenoid valve 23. When the backward signal is turned ON, the controller 32 turns the energizing signal of the relay 35 ON to energize the solenoid valve 24.

In the forklift truck 10 of the present embodiment, when the engine is started (or when power source is input), if the driver leaves the seat once and then is reseated, a first condition of the return of a running state is that the driver is seated and the manipulation position of the lever 29 is the neutral position. Also, a second condition of the return of the running state is that the first condition is formed and then the driver manipulates the lever 29 to the forward position or the backward position. If the first condition is formed and then the second condition is formed, the solenoid valve 23 or 24 is energized to restore the running state. That is, when the driver who has left the seat is reseated in the driving position (or when another driver is seated in the driving position), if he or she expresses intention of manipulating the lever 29 from the neutral position to the forward or backward position, the running state is restored. By so constructing the forklift truck 10 which is a vehicle with the torque converter (automatic), even if the driver leaves the seat once with the lever 29 manipulated to the forward or backward position and then is reseated, the vehicle does not run away due to a creep phenomenon of the torque converter peculiar to this type of vehicle. That is, when the driver leaves the seat once with the lever 29 manipulated to the forward or backward position, if the lever 29 is returned to the neutral position once and then manipulated to the forward or backward position, the running state is restored.

Therefore, the present embodiment has the following advantageous effects.

(1) When the driver leaves the seat so that the switch 26 detects non-seating of the driver, the controller 32 breaks the energization of the solenoid valve 23 or 24. After the controller 32 detects that the driver is seated and that the manipulation position of the lever 29 is the neutral position, if the manipulation position of the lever 29 is located in the forward or backward position, the controller 32 energizes the solenoid valve 23 or 24 to restore the running state. Therefore, when the driver leaves the seat, energization of the solenoid valves 23 and 24 is broken regardless of the manipulation position of the lever 29. On the other hand, when the driver who has left the seat is reseated, the solenoid valve 23 or 24 is not reenergized unless the driver expresses the intention of manipulating the lever 29 to the forward or backward position. Consequently, erroneous running return due to erroneous detection of various detection switches is prevented thereby to improve reliability of the return of the running return.

(2) The condition of the return of the running state is that the driver manipulates the lever 29 from the neutral position to the forward or backward position in addition to the condition that the driver is seated and the lever 29 is in the neutral position. Therefore, even the forklift truck 10 with the torque converter 20 (automatic) can prevent it from running away against the driver's intention due to the creep phenomenon in restoring the running state. Thus, the reliability of the return of the running return is further improved. In addition, safety of the forklift truck 10 is further improved.

(3) The seat 25 is provided with the switch 26, which detects whether the driver is seated in the driver's cab 15 in the driving position. Since it is directly detected by the switch 26 whether or not the driver is seated in the driver's cab 15 in the driving position, the reliability of the return of the running return is improved.

(4) The condition of the return of the running state is formed by the driving manipulation (indication of forward or backward movement) of the lever 29 by the driver. Therefore, when the running state is restored, the driver does not need special manipulation, so that the maneuverability of the forklift truck 10 is not spoiled. In addition, the manipulation of the lever 29 is one of ways of reflecting the driver's driving intention the most remarkably, which provides a safety device that the driver's intention is reflected. That is, the running state can be restored in accordance with the driver's intention.

The above embodiment may be modified as follows.

In the above embodiment, the seat 25 (the driver's cab 15) may be provided with a seat belt instead of the switch 26 to detect a wearing state of the seat belt, so that energization or break of energization of the solenoid valves 23 and 24 may be controlled. In this structure, if the seat belt is not worn, the solenoid valves 23 and 24 are not energized, which obliges the driver to wear the seat belt. Therefore, further safe running is achieved.

The above embodiment may be applied to the forklift truck with a standing ride type driver's cab. In this case, the driver may operate a detection switch provided in the driver's cab, such as floor switch so that the switch detects whether the driver is seated in the driver'cab in the driving position from the operation state of the switch. In this case, the driving position is a standing position and the driver is seated in the driver's cab in the standing position.

The above embodiment may dispense with the relays 34 and 35 so that the controller 32 controls the solenoid valves 23 and 24 directly.

In the above embodiment, the structure of the solenoid valves 23 and 24 may be modified. For example, 3-position 4-port valve may be used instead of the solenoid valves 23 and 24 to switch the flow of the hydraulic fluid.

In the above embodiment, a switch type direction indication member may be used instead of the lever 29 so that forward or backward movement is indicated by manipulation of the switch.

In the above embodiment, the normally closed contacts 34a and 35a of the relays 34 and 35 may be replaced by normally open contacts.

Although the above embodiment is embodied to the forklift truck 10 that serves as an industrial vehicle, it may be embodied to the industrial vehicle other than the forklift truck, such as towing tractor.

Therefore, the present examples and embodiments are to be considered as illustrative and not restrictive, and the invention is not to be limited to the details given herein but may be modified within the scope of the appended claims.

What is claimed is:

1. An industrial vehicle having drive wheels driven by an engine, comprising:
    a power transmission device through which the engine is connected to the drive wheels for transmitting output of the engine to the drive wheels thereby to run the vehicle;
    a driver detection switch for detecting whether a driver of the vehicle is seated in a driver's cabin in a driving position;
    a direction indication member manipulated by the driver for indicating forward or backward movement of the vehicle;
    a position detection switch for detecting a manipulation position of the direction indication member;
    an electromagnetic control valve for changing flow of hydraulic fluid supplied into the power transmission device; and
    a controller for controlling an energizing state of the electromagnetic control valve, the controller being electrically connected to the driver detection switch and the position detection switch, the controller outputting a signal to break energization of the electromagnetic control valve if the driver detection switch detects that the driver is not seated, the controller outputting another signal to energize or reenergize the electromagnetic control valve if the driver detection switch detects that the driver is seated and then the position detection switch detects that the manipulation position of the direction indication member is changed from a neutral position to a forward or backward position.

2. The industrial vehicle according to claim 1, wherein the controller is electrically connected to the electromagnetic control valve through a relay, the controller outputs the signals to the relay.

3. The industrial vehicle according to claim 2, wherein the relay has a contact and a relay coil, the contact is electrically connected to the position detection switch and the electromagnetic control valve, the relay coil is electrically connected to the controller.

4. The industrial vehicle according to claim 1, wherein the power transmission device is an automatic transmission with a torque converter.

5. The industrial vehicle according to claim 1, wherein the driver detection switch is a switch for detecting whether the driver is seated in a seat provided in the driver's cabin.

6. The industrial vehicle according to claim 1, wherein the direction indication member is a shift lever.

7. The industrial vehicle according to claim 1, wherein the position detection switch is a direction switch.

8. The industrial vehicle according to claim 1, wherein the electromagnetic control valve is a solenoid valve.

* * * * *